United States Patent [19]

Cram et al.

[11] 4,030,523

[45] June 21, 1977

[54] DIGITAL FLOW CONTROL SYSTEM

[75] Inventors: Robert E. Cram, Ridgecrest; Walter Gill; James A. Loundagin, both of China Lake, all of Calif.

[73] Assignee: The United States of America as represented by the Secretary of the Navy, Washington, D.C.

[22] Filed: Apr. 19, 1976

[21] Appl. No.: 677,944

[52] U.S. Cl. ............................................. 137/599
[51] Int. Cl.² ........................................ G05D 7/06
[58] Field of Search ...................... 137/599; 91/31

[56] References Cited
UNITED STATES PATENTS

| | | | |
|---|---|---|---|
| 2,229,903 | 1/1941 | Schmol | 137/599 |
| 3,010,316 | 11/1961 | Snyder | 137/599 X |
| 3,072,146 | 1/1963 | Gizeski | 137/599 X |
| 3,308,619 | 3/1967 | Richardson et al. | 137/599 X |
| 3,726,296 | 4/1973 | Friedland et al. | 137/599 X |
| 3,905,394 | 9/1975 | Jerde | 137/599 |
| 3,942,553 | 3/1976 | Gallitin | 137/599 |

*Primary Examiner*—Robert G. Nilson
*Attorney, Agent, or Firm*—R. S. Sciascia; Roy Miller; W. Thom Skeer

[57] ABSTRACT

A digital flow control system for testing ramjet engines that permits control of fuel in steps, or percentages, of full flow rate. Four cavitating venturis connected to four valves control the flow rate through the valves such that the fuel flow rate is regulated in 10% increments of full flow rate depending upon the combination of valves which are open.

1 Claim, 3 Drawing Figures

DIGITAL FLOW CONTROL SYSTEM

BACKGROUND OF THE INVENTION

The present invention relates to flow rate control, and more particularly to flow rate control of a fluid in increment steps.

During ramjet testing it often is desirable to bring the engine to a certain operating condition, i.e., fuel flow to engine, hold for a short time to take necessary data, then change to a new point. In the past the fuel has been controlled by a hand operated needle valve. A typical ramjet engine combustor test lasts about 30 seconds; usually because the engine is in a developmental stage and has little or no thermal protection. Having only 30 seconds, the operator tends to move the needle too fast, never stopping. The engine stays in a transient state during the entire operation, thus giving invalid data.

Also, it is often desirable to compare different engine configurations operating with the same fuel flow. With the needle valve fuel control and an automated data acquisition system, the operator seldom settles on the same fuel flow point twice.

SUMMARY OF THE INVENTION

The digital flow control system provides a supply of fluid in steps, or percentages, or full flow rate. Four cavitating venturis, which for a given upstream pressure allow a flow rate directly proportional to their respective throat areas, with area ratios 1:2:2:5 are controlled by individual valves to give flow rates from 0% to 100% of full flow rate in steps of 10%.

DESCRIPTION OF THE PREFERRED EMBODIMENT

Figure 2:
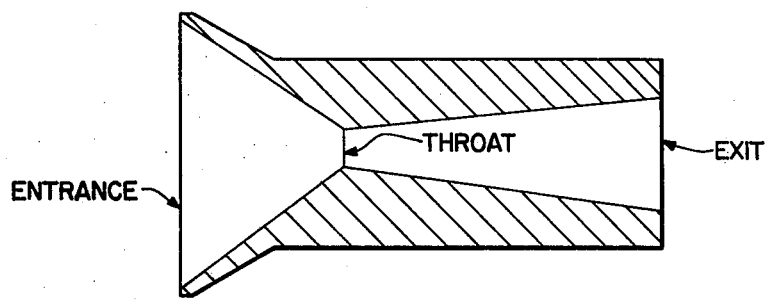
FIG. 2 is a cross-section of a cavitating venturi.

Consider the fluid flow through a venturi as illustrated in FIG. 2. The flow rate between the entrance and the throat is given by $$m = C_d A_t \sqrt{2(P_{ent} - P_t) \rho g} \qquad 1.$$

where
$m$ = mass flow rate,
$P_{ent}$, $P_t$ = pressure at the entrance and throat, respectively,
$A_t$ = area of cross-section of the throat,
$\rho$ = density of fluid,
$g$ = gravity constant, and
$C_d$ = discharge coefficient.

If $A_t$ is very small so that $P_t$ is equal to the vapor pressure of the fluid, and $P_{ent}$ is very large compared to $P_t$, then $$m = C_d A_t \sqrt{2 P_{ent} \rho g}. \qquad 2.$$

If $P_{ent}$ is maintained at a constant value, then $$m \sim A_t. \qquad 3.$$

Figure 1:
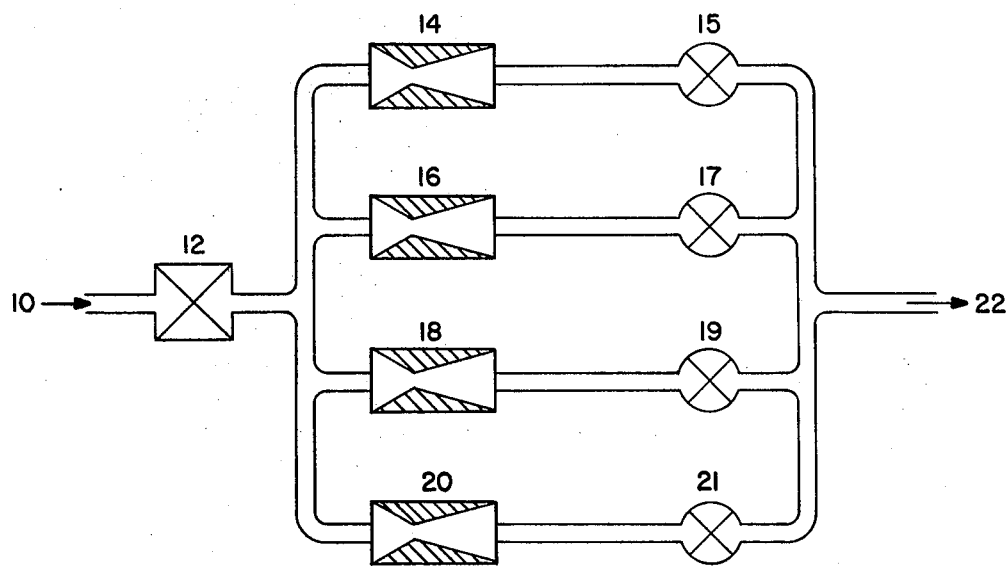
FIG. 1 is a schematic of the present invention.

Referring now to FIG. 1, fluid enters the digital flow control system at an inlet port 10. A pressure regulator 12 connects the incoming fluid to each of four cavitating venturis 14, 16, 18, 20. Electrically operated flow control valves 15, 17, 19, 21 control the flow fluid through respective venturis 14, 16, 18, 20. The fluid then exits the digital flow control system through an exit port 22 to the engine under test. The valves 15, 17, 19, 21 operate in either an open or a closed configuration.

The four venturis 14, 16, 18, 20 have throat areas in the ratio of 1:2:2:5 to control the exit flow rate in steps of 10% of full flow rate. The pressure regulator 12 maintains a constant pressure at the entrance of each of the four venturis 14, 16, 18, 20. Referring to Table 1 the exit flow rate is dependent upon which of the valves 15, 17, 19, 21 are open.

TABLE 1

| Percent Total Flow | Valve 1 (A = 1) | Valve 2 (A = 2) | Valve 3 (A = 2) | Valve 4 (A = 5) |
|---|---|---|---|---|
| 0 | 0 | 0 | 0 | 0 |
| 10 | 1 | 0 | 0 | 0 |
| 20 | 0 | 1 | 0 | 0 |
| 30 | 1 | 1 | 0 | 0 |
| 40 | 0 | 1 | 1 | 0 |
| 50 | 0 | 0 | 0 | 1 |
| 60 | 1 | 0 | 0 | 1 |
| 70 | 0 | 1 | 0 | 1 |
| 80 | 1 | 1 | 0 | 1 |
| 90 | 0 | 1 | 1 | 1 |
| 100 | 1 | 1 | 1 | 1 | where 0 = closed, 1 = open.

Figure 3:
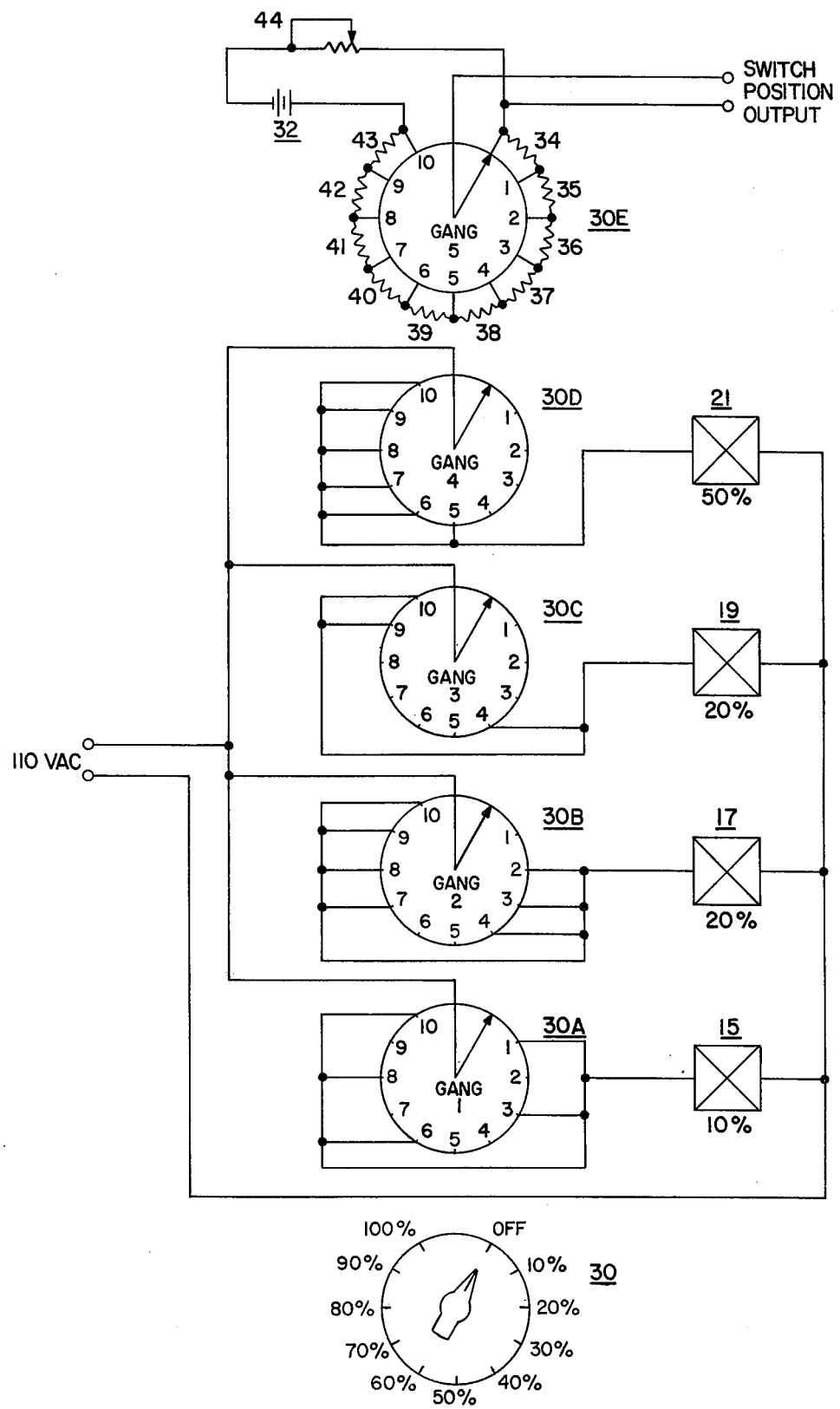
FIG. 3 is a schematic of the valve control switch/position indicator.

A rotary switch 30 with a plurality of wafers 30A, 30B, 30C, 30D, 30E is wired as shown in FIG. 3 to switch the valves 15, 17, 19, 21 according to the "truth table" illustrated in Table 1, and to indicate the position of the rotary switch. A dry cell battery 32 in series with a combination of series resistors 34, 35, 36, 37, 38, 39, 40, 41, 42, 43, one between each pair of consecutive switch positions of wafer 30E for 0 to 10, and a potentiometer 44, provides an output voltage between the switch position and one side of the battery that is equal to the position of the rotary switch 30, or the percent of total flow. For example, with the battery 32 being 12 volts a 2 volt output might be equal to switch position 2, or 20% of total flow, where the resistors 34, 35, 36, 37, 38, 39, 40, 41, 42, 43 around the switch wafer 30E are of the same value and potentiometer 44 is provided to adjust for a 10 volt drop across the series resistors.

The flow control valves 15, 17, 19, 21 are electrically operated and opened by 110 VAC. Each position of the rotary switch 30 supplies power to the correct valves, thus opening them, and shuts off power to the other valves, thus closing them, depending upon the flow rate selected.

The pressure regulator 12 sets and maintains the supply pressure, $P_{ent}$, to the venturis 14, 16, 18, 20, which venturis are machined of stainless steel and are configured to fit inside a tubing connector.

The use of this digital flow control system gives discrete stable points of engine operation, thus eliminating data taken during transient conditions of ramjet engine testing. It allows repeatability of the engine test conditions from test to test, and is an accurate means of determining fuel flow rate to the engine.

Obviously, any device requiring step control of a fluid flow rate can use this digital flow control system, coupling a digital code with the throat areas of cavitating venturis.

What is claimed is:

1. A fluid flow control system having digital flow characteristics comprising:
   an inlet port for admitting fluid flow to the system;
   regulating means connected to said inlet port for assuring a predetermined pressure in said fluid flow to sustain downstream venturi action;
   four manifold branches each connected to said regulating means providing fluid flow paths therefrom;
   four clear-aperture, cavitation venturis one of which is mounted in each manifold branch to receive the fluid flow therein and having throat areas which are in the ratio of 1:2:2:5 to provide incremental decimally related fluid flow from said inlet port;
   four bistable, electrically-actuated control valves one of which is mounted in each of said manifold branches for selectively controlling the fluid flow therein;
   an electrical switch having five wafers and eleven positons;
   an electrical energy source connected to inputs of each of said five wafers;
   circuit means connecting said four bistable, electrically actuated control valves to four of the five wafers of said electrical switch such that each position of said switch sequentially steps said total flow rate from zero to full flow in ten percent steps;
   means connected to the fifth wafer of said electrical switch for obtaining an electrical output indicative of the selected switch position corresponding to the selected percentage of full flow rate; and
   an exit port connected to said four manifold branches for collecting the gas flow outputs therefrom into a single fluid flow stream for feed to a fluid utilization means.

* * * * *